United States Patent
Lee et al.

(10) Patent No.: US 9,979,236 B2
(45) Date of Patent: May 22, 2018

(54) WIRELESS POWER TRANSMITTING APPARATUS

(71) Applicant: LG ELECTRONICS INC., Seoul (KR)

(72) Inventors: Hyunbeom Lee, Seoul (KR); Kihyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 14/900,770

(22) PCT Filed: Jun. 30, 2014

(86) PCT No.: PCT/KR2014/005822
§ 371 (c)(1),
(2) Date: Dec. 22, 2015

(87) PCT Pub. No.: WO2015/002422
PCT Pub. Date: Jan. 8, 2015

(65) Prior Publication Data
US 2016/0141884 A1    May 19, 2016

(30) Foreign Application Priority Data
Jul. 1, 2013    (KR) .................. 10-2013-0076575

(51) Int. Cl.
*H01F 27/42* (2006.01)
*H01F 37/00* (2006.01)
*H01F 38/00* (2006.01)
*H02J 50/12* (2016.01)
*H02J 50/40* (2016.01)
*H02J 50/80* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01); *H02J 50/40* (2016.02); *H02J 50/80* (2016.02); *H02J 50/90* (2016.02)

(58) Field of Classification Search
USPC ......................................... 307/104; 455/41.1
See application file for complete search history.

(56) References Cited

U.S. PATENT DOCUMENTS 8,855,554 B2 * 10/2014 Cook ...................... H02J 5/005
                                              455/41.1
9,672,979 B2 *  6/2017 Matsui .................... H01F 38/14
(Continued)

FOREIGN PATENT DOCUMENTS

JP      2013-115909 A    6/2013
JP      2013-118719 A    6/2013

*Primary Examiner* — Adam Houston
(74) *Attorney, Agent, or Firm* — Birch, Stewart, Kolasch & Birch, LLP

(57) ABSTRACT

A wireless power transmitter according to one exemplary embodiment of the present disclosure includes a body having a transmitting coil unit embedded therein, and having one surface with a portable electronic device located thereon, the portable electronic device receiving power from the transmitting coil unit in a wireless manner, and a driving unit that is configured to rotate the transmitting coil unit centering on a shaft penetrating through the transmitting coil unit, such that the transmitting coil unit is moved close to a receiving coil unit of the portable electronic device.

11 Claims, 14 Drawing Sheets

(51) Int. Cl.
*H02J 50/90* (2016.01)
*H02J 17/00* (2006.01)
*H02J 5/00* (2016.01)
*H02J 7/02* (2016.01)

(56) References Cited

U.S. PATENT DOCUMENTS

| | | | |
|---|---|---|---|
| 2011/0062916 A1 | 3/2011 | Farahani | |
| 2011/0074344 A1 | 3/2011 | Park et al. | |
| 2012/0169139 A1 | 7/2012 | Kudo | |
| 2012/0235788 A1* | 9/2012 | Lakirovich | H01F 38/14 340/5.64 |
| 2014/0125146 A1* | 5/2014 | Azancot | H01F 38/14 307/104 |
| 2014/0300316 A1* | 10/2014 | Miwa | G06Q 30/04 320/108 |
| 2014/0333151 A1* | 11/2014 | Matsui | H02J 5/005 307/104 |
| 2016/0141884 A1* | 5/2016 | Lee | H02J 17/00 307/104 |
| 2017/0207658 A1* | 7/2017 | Bana | H02J 50/12 |
| 2017/0237295 A1* | 8/2017 | Yuasa | H01F 38/14 307/104 |

* cited by examiner

[Fig. 1]
[Fig. 2]
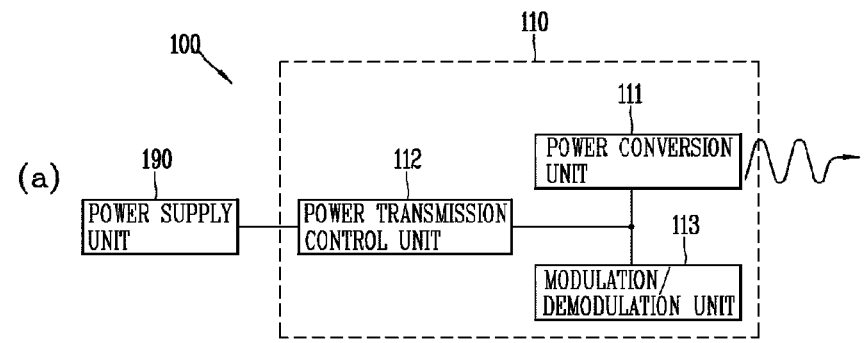
[Fig. 3]
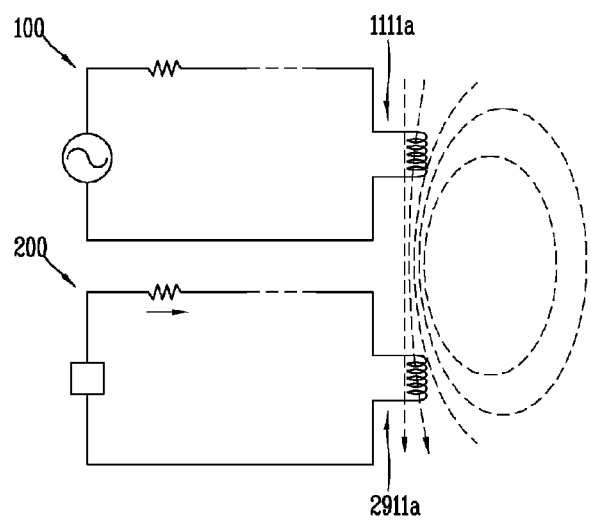

[Fig. 4]
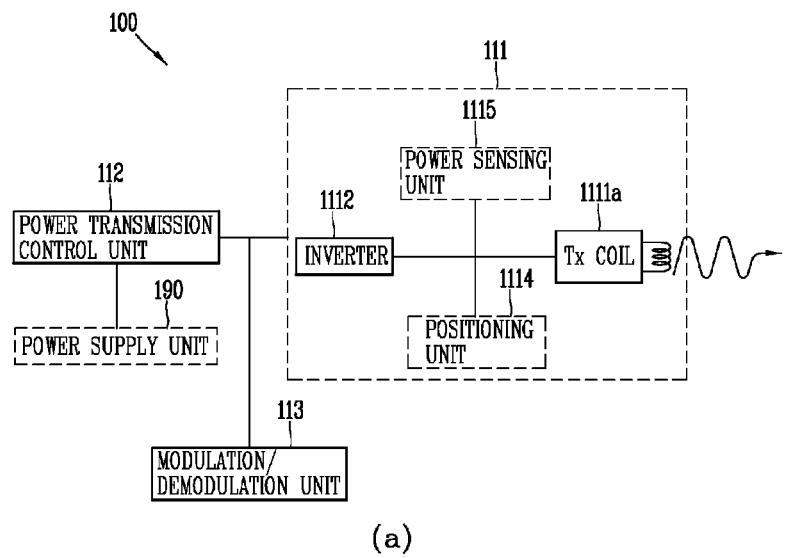
(a)
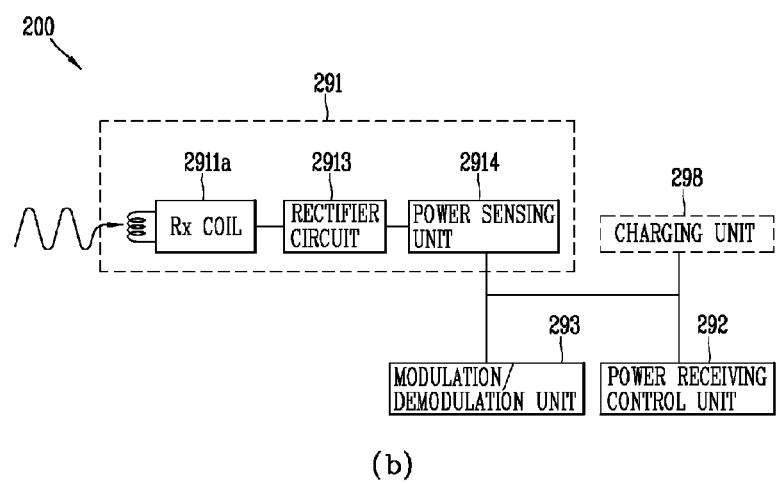
(b)

[Fig. 5]
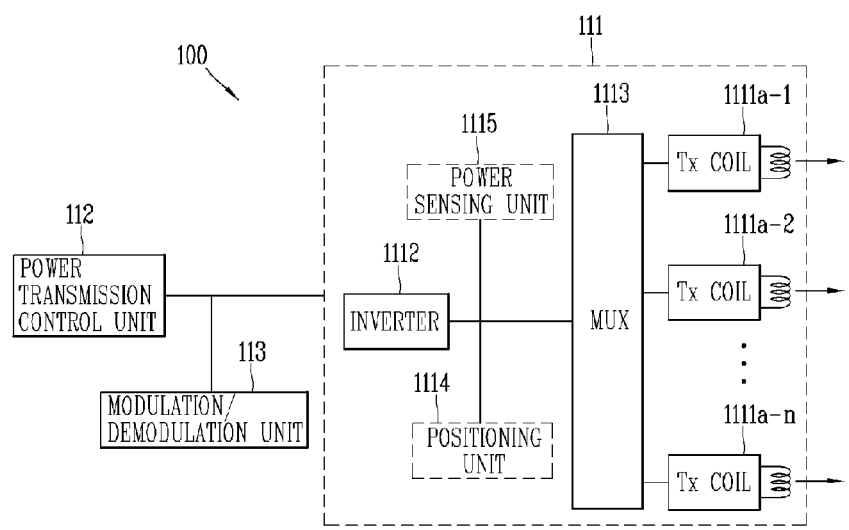
[Fig. 6]
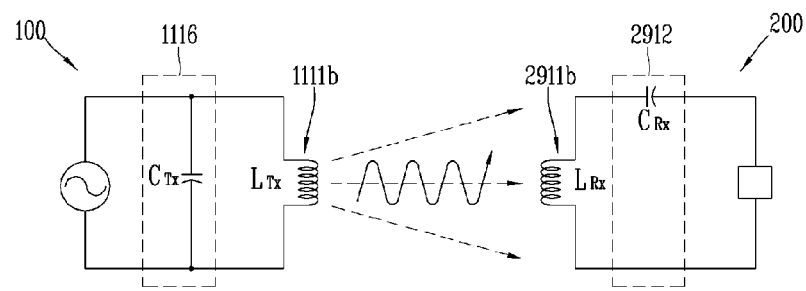

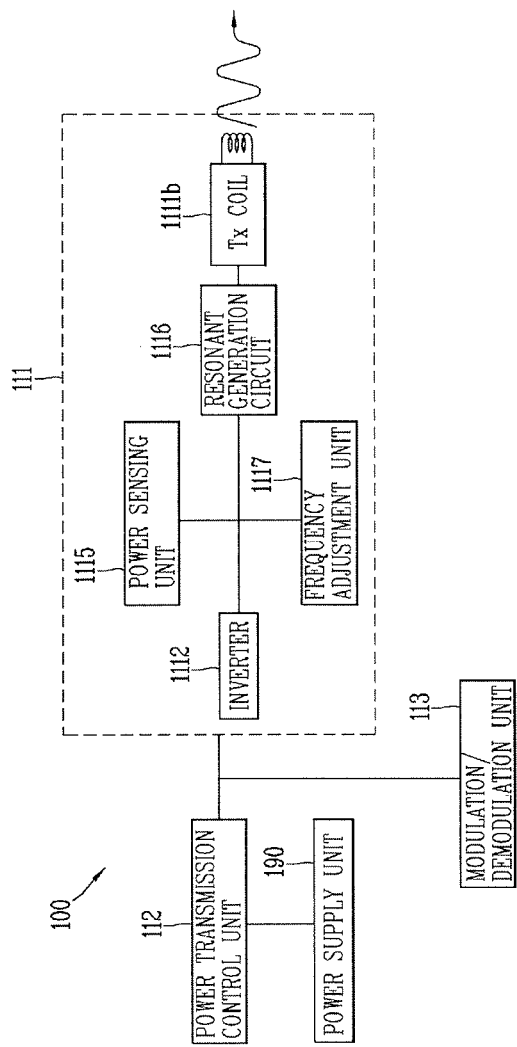

[Fig. 7b]
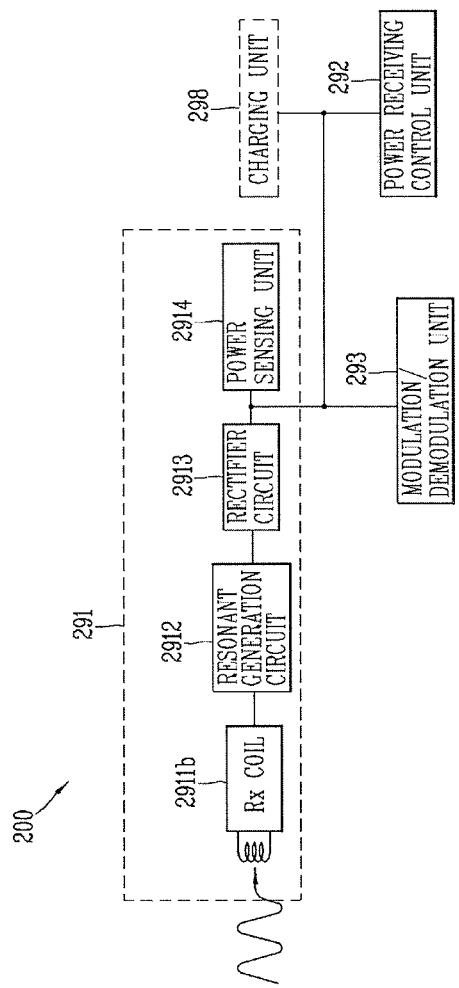

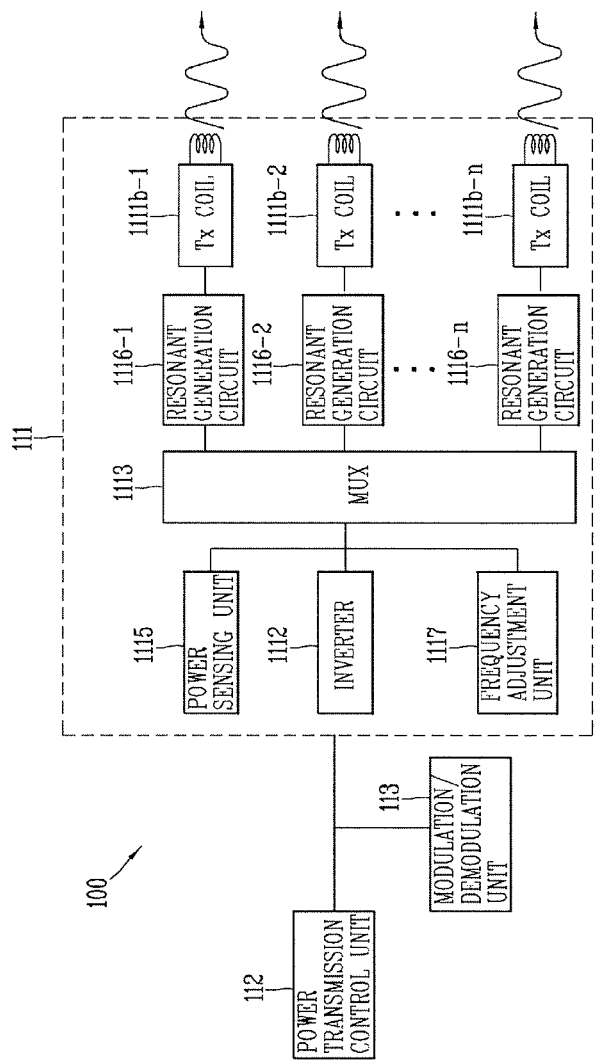
[Fig. 8]

[Fig. 9]
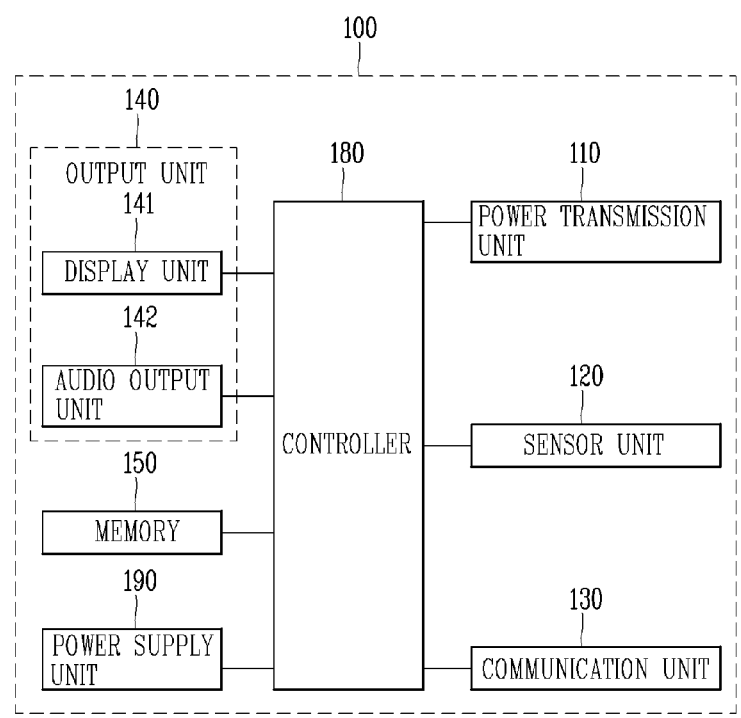

[Fig. 10]
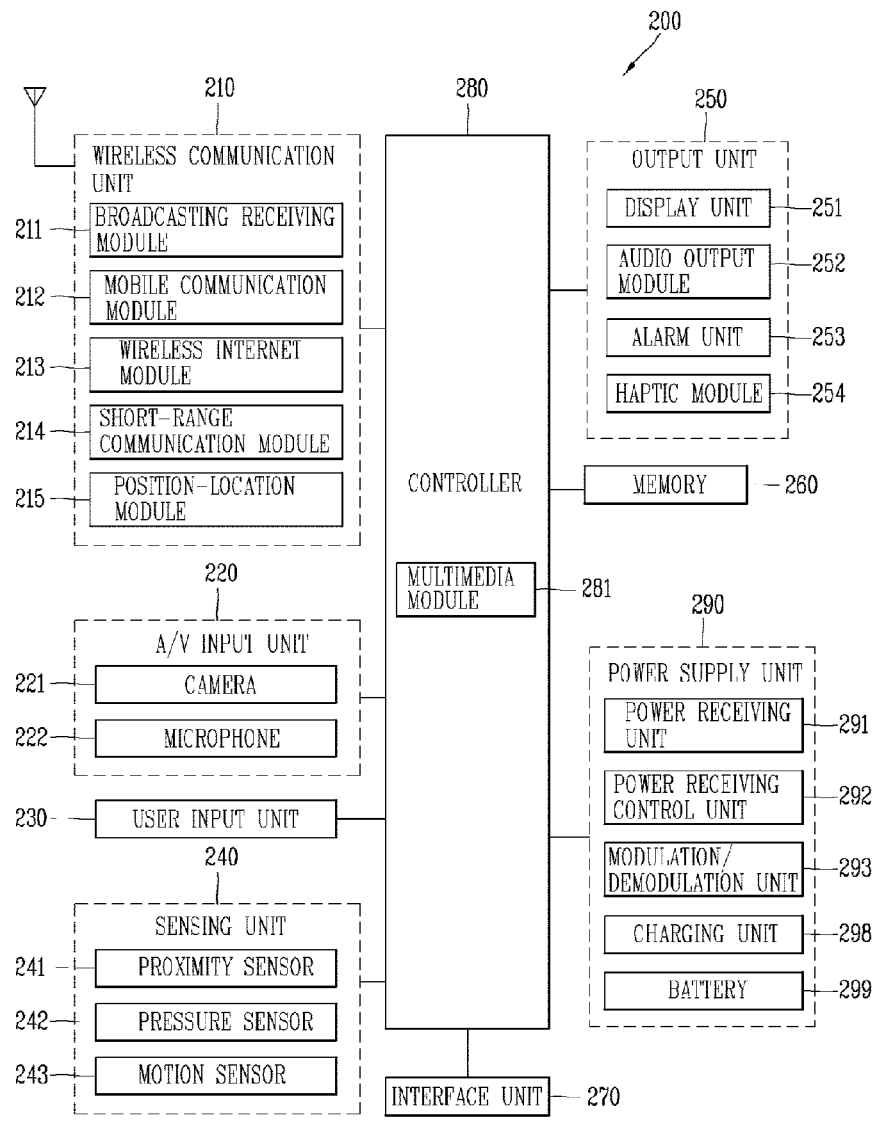
[Fig. 11]
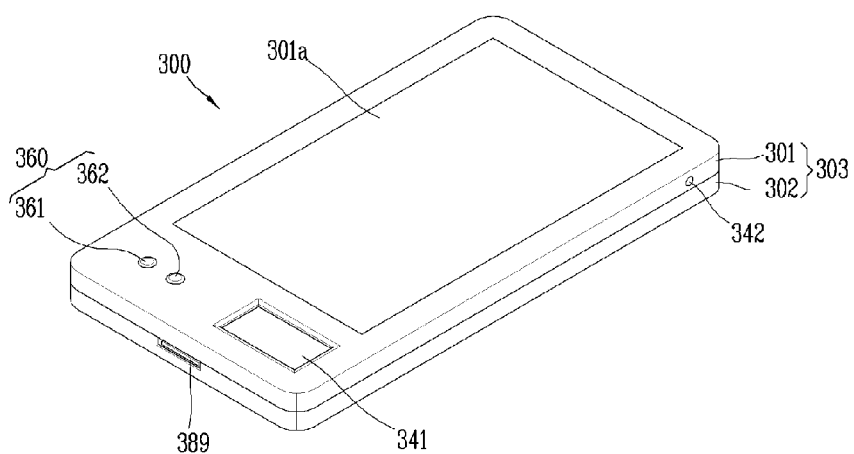

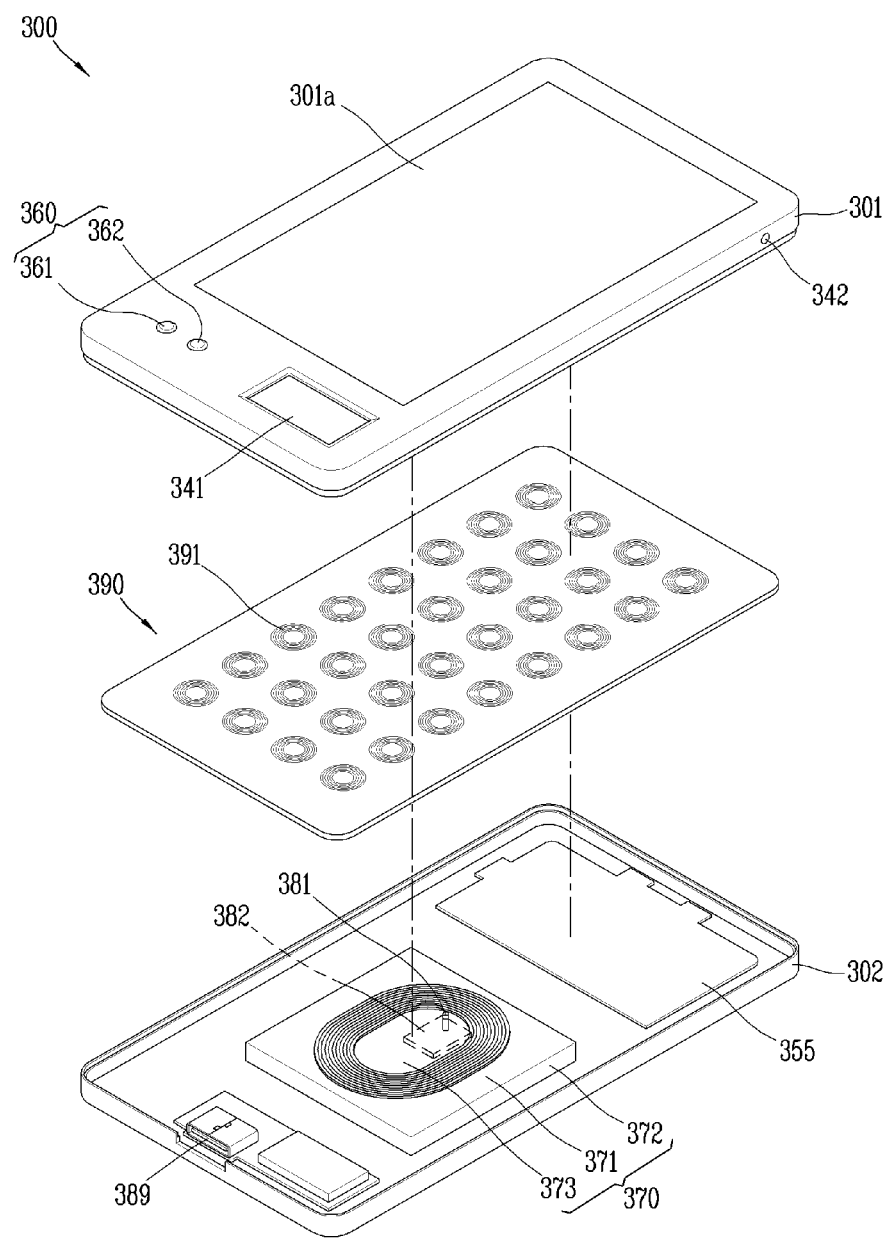
[Fig. 12]

[Fig. 13a]
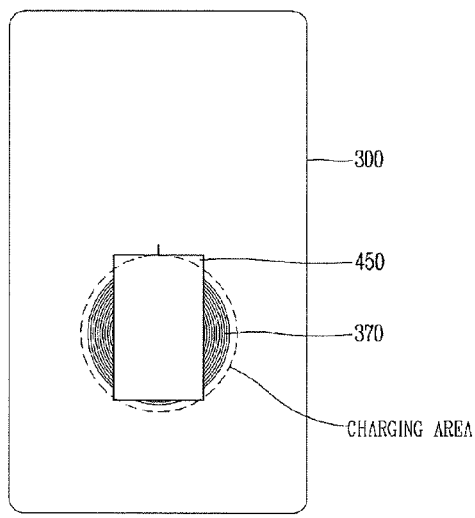
[Fig. 13b]
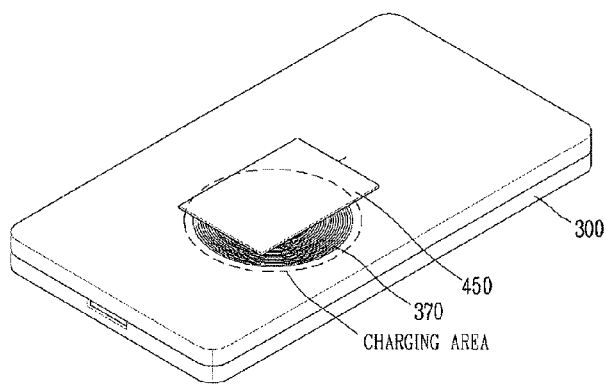
[Fig. 14a]
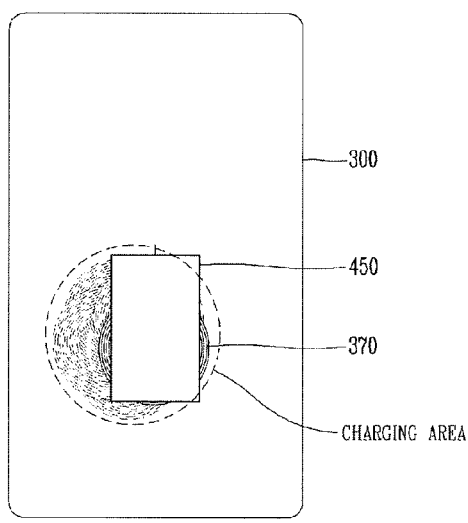

[Fig. 14b]
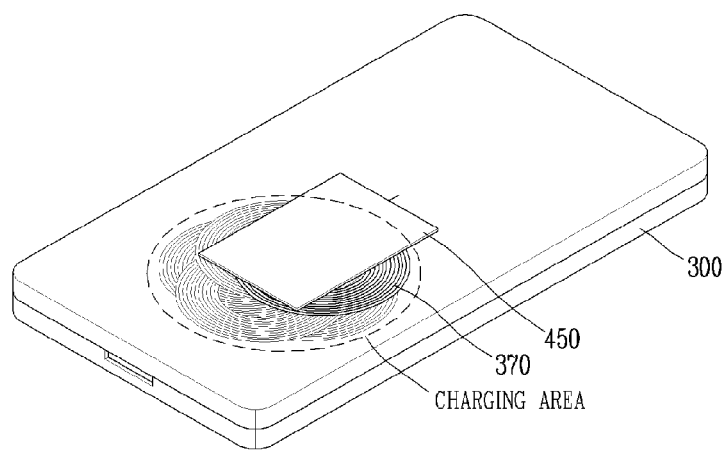
[Fig. 15a]
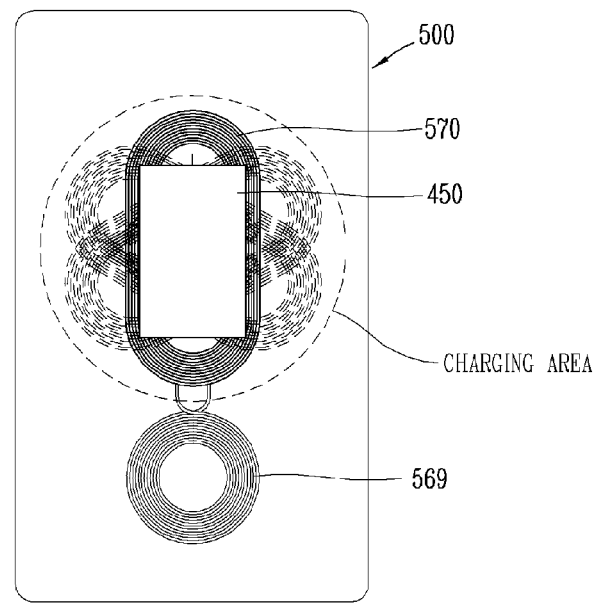
[Fig. 15b]
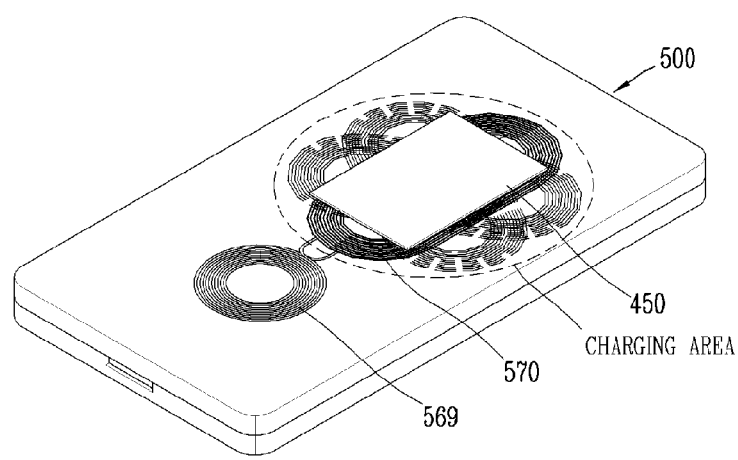

[Fig. 16a]
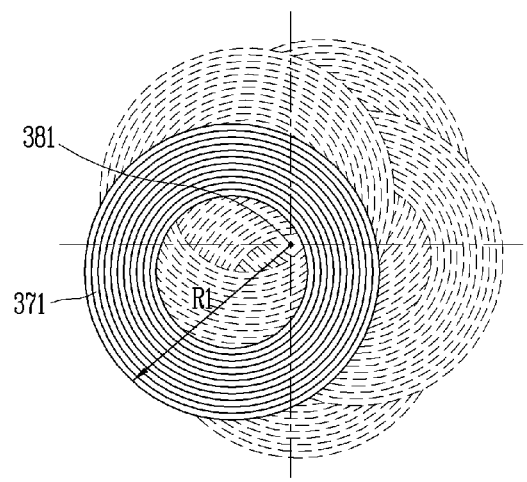
[Fig. 16b]
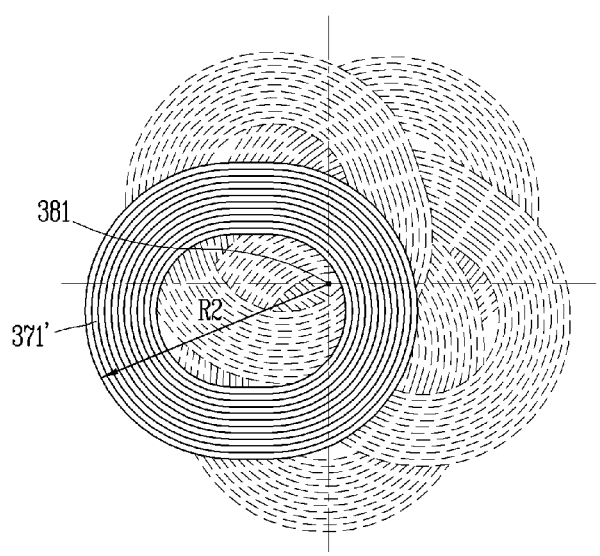
[Fig. 16c]
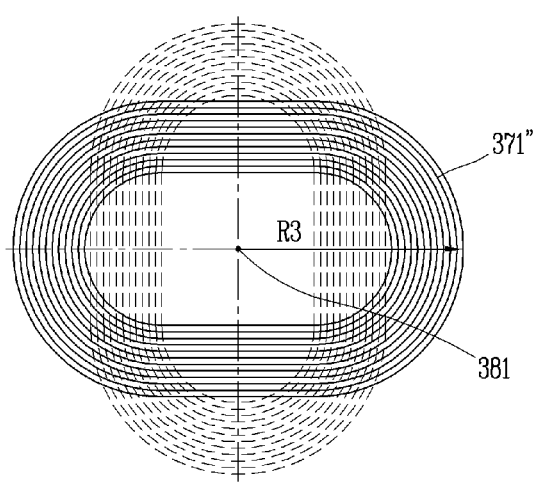

[Fig. 16d]
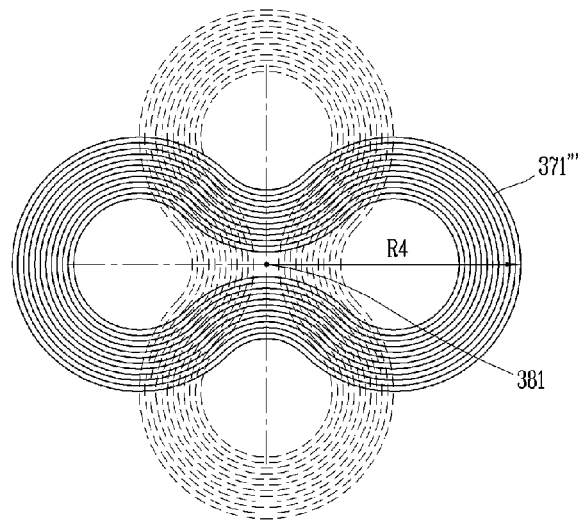
[Fig. 17a]
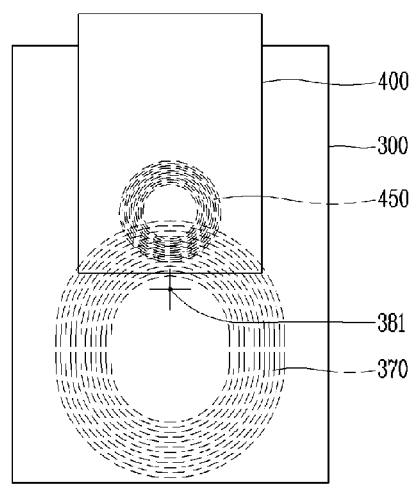
[Fig. 17b]
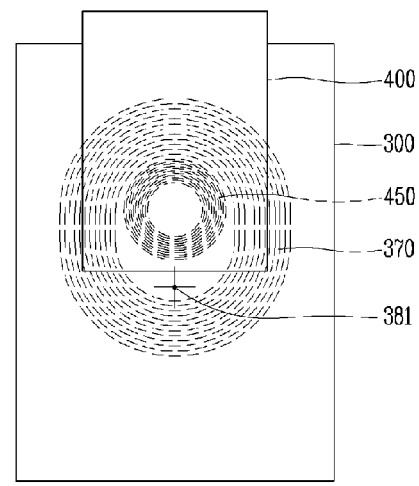

[Fig. 18]
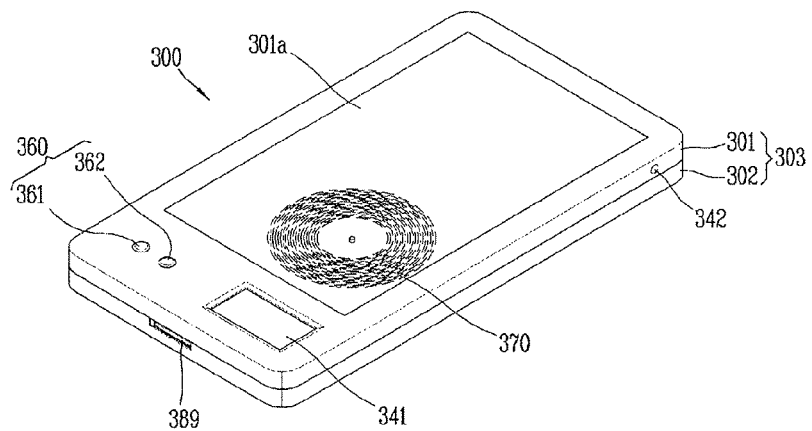
[Fig. 19]
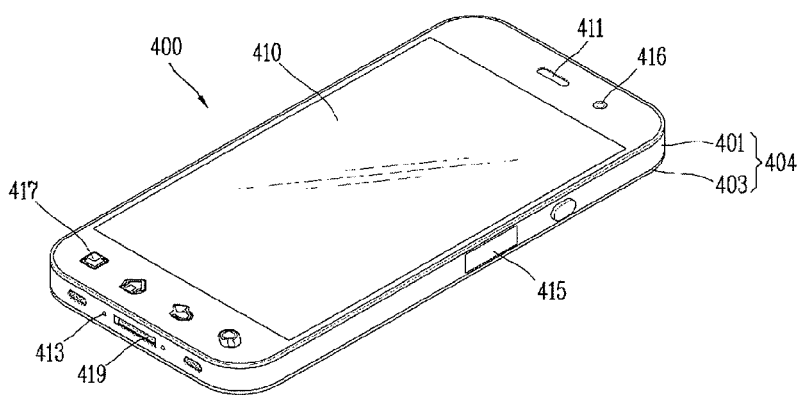
[Fig. 20]
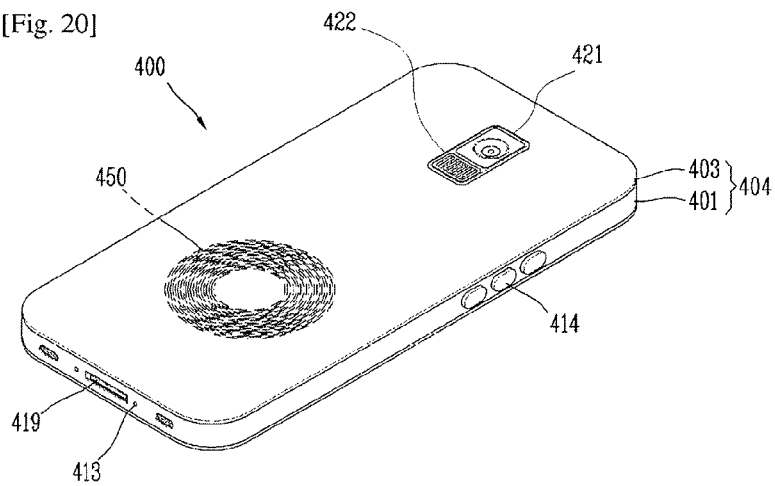

WIRELESS POWER TRANSMITTING APPARATUS

TECHNICAL FIELD

The present disclosure relates to a wireless power transfer, and more particularly, a wireless power transmitter (or a wireless power transmitting apparatus) having an extended operation area by a new structure of a transmitting coil upon a wireless power transfer.

BACKGROUND ART

Recently, an increase in power consumption by smart phones, tablet PCs and the like has derived development of various types of wireless charging devices (or chargers) for portable devices which should be frequently recharged. However, the wireless charging device has a narrow charging area due to a size of its transmitting coil. For an inductive wireless charging device, there has been a disadvantage in that a receiving coil of a portable device (or a mobile device) and a transmitting coil of the charging device should be aligned with each other at a (re)charging operation. Due to the narrow charging area, demands of product developers and consumers are increasing for a continuous increase in the charging area.

As a method for extending the charging area, there may be two methods, namely, changing a shape of a transmitting coil and moving the transmitting coil. As the method of changing the shape of the transmitting coil to increase the charging area, a charging device having transmitting and receiving coils in a triangular shape or an oval shape may be provided. As the method of moving the transmitting coil to increase the charging area, a charging device further having a transfer unit for allowing the transmitting coil to be movable on X and Y axes. When the shape of the coil is changed to increase the charging area, charging efficiency may be lowered. Also, for the charging device allowing the X and Y-axial movement of the transmitting coil, the charging area may be ensured without a reduction of charging efficiency but an increase in fabricating costs and difficulty in development and production may be caused due to mechanical complexity of the transfer unit.

Therefore, a method of ensuring a charging area without a reduction of charging efficiency and an increase in fabricating costs of a charger (or a charging device), with simplifying a mechanical structure, may be taken into account.

SUMMARY OF THE INVENTION

Therefore, to obviate those problems, an aspect of the detailed description is to extend an operation area of a wireless power transmitter (or a wireless power transmitting apparatus).

Another aspect of the detailed description is to provide an effective structure of a transmitting coil suitable for a wireless power transmitter.

To achieve these and other advantages and in accordance with the purpose of the present invention, as embodied and broadly described herein, there is provided a wireless power transmitter including a body having a transmitting coil unit embedded therein, and having one surface with a portable electronic device located thereon, the portable electronic device receiving power from the transmitting coil unit in a wireless manner, and a driving unit that is configured to rotate the transmitting coil unit centering on a shaft penetrating through the transmitting coil unit, such that the transmitting coil unit is moved close to a receiving coil unit of the portable electronic device.

In accordance with one exemplary embodiment disclosed herein, the wireless power transmitter may further include a sensing unit that is configured to sense a position of the receiving coil unit.

In accordance with one exemplary embodiment disclosed herein, the sensing unit may include a substrate having one surface divided into a plurality of areas, and sensing coils disposed on the areas, respectively.

In accordance with one exemplary embodiment disclosed herein, the wireless power signal may further include a controller that is configured to transmit a control signal to the driving unit based on a signal received from each of the sensing coils.

In accordance with one exemplary embodiment disclosed herein, the controller may transmit the control signal to the driving unit at a preset time interval based on the signal received from each of the sensing coils to maintain charging efficiency more than a predetermined level.

In accordance with one exemplary embodiment disclosed herein, the body may further include a display that is configured to output a level of charging efficiency.

In accordance with one exemplary embodiment disclosed herein, the shaft may be provided with a cavity, through which a conducting wire for connecting the transmitting coil unit and an inverter to each other is inserted.

In accordance with one exemplary embodiment disclosed herein, the body may have at least part formed transparent such that the transmitting coil unit is visible therethrough.

In accordance with one exemplary embodiment disclosed herein, the shaft may be located at a position spaced from a center of the transmitting coil unit.

In accordance with one exemplary embodiment disclosed herein, the transmitting coil unit may have a cross-section in an oval shape.

In accordance with one exemplary embodiment disclosed herein, the wireless power transmitter may further include a first coil connected to an inverter, and the transmitting coil unit may include a second coil receiving induced power from the first coil.

In accordance with one exemplary embodiment disclosed herein, the transmitting coil unit may be configured in such a manner that an impedance value thereof is changed according to positions of the receiving coil unit and the transmitting coil unit. The wireless power transmitter may further include a controller that is configured to transmit a control signal to the driving unit such that the impedance value is present within a preset range.

A wireless power transmitter according to at least one exemplary embodiments disclosed herein may be configured to have a more extended operation area.

BRIEF DESCRIPTION OF DRAWINGS

FIG. 1 is an exemplary view conceptually illustrating a wireless power transmitter and an electronic device according to the embodiments of the present invention.

(a) and (b) of FIG. 2 are exemplary block diagrams illustrating the configuration of a wireless power transmitter 100 and an electronic device (or wireless power receiver) 200 that can be employed in the embodiments disclosed herein, respectively.

FIG. 3 is a view illustrating a concept in which power is transferred from the wireless power transmitter to the electronic device in a wireless manner according to an inductive coupling method.

FIG. 4 is a block diagram illustrating part of the wireless power transmitter 100 and the electronic device 200 in a magnetic induction method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

FIG. 6 is a view illustrating a concept in which power is transferred to the electronic device from the wireless power transmitter in a wireless manner according to a resonance coupling method.

FIGS. 7A and 7B are block diagrams illustrating part of the wireless power transmitter 100 and the electronic device 200 in a resonance method that can be employed in the embodiments disclosed herein.

FIG. 8 is a block diagram illustrating a wireless power transmitter configured to have one or more transmitting coils receiving power according to a resonance coupling method that can be employed in the embodiments disclosed herein.

FIG. 9 is a block diagram illustrating a wireless power transmitter further including an additional element in addition to the configuration illustrated in (a) of FIG. 2.

FIG. 10 is a view illustrating a configuration in case where an electronic device (or wireless power receiver) 200 according to the embodiments disclosed herein is implemented in the form of a mobile terminal.

FIG. 11 is a front perspective view of a wireless power transmitter in accordance with one exemplary embodiment disclosed herein.

FIG. 12 is an exploded perspective view of FIG. 11.

FIGS. 13A and 13B are usage-state views of a wireless power transmitter and a wireless power receiver according to a comparative embodiment.

FIGS. 14A and 14B are usage-state views of a wireless power transmitter and a wireless power receiver according to an exemplary embodiment disclosed herein.

FIGS. 15A and 15B are usage-state views of a wireless power transmitter and a wireless power receiver according to another exemplary embodiment disclosed herein.

FIGS. 16A to 16D are views illustrating a shape of a coil and an arrangement of a shaft in accordance with each exemplary embodiment disclosed herein.

FIGS. 17A and 17B are conceptual views illustrating an example of a transmitting coil unit.

FIG. 18 is a front perspective view of a wireless power transmitter in accordance with another exemplary embodiment disclosed herein.

FIG. 19 is a front perspective view of a mobile terminal in accordance with one exemplary embodiment disclosed herein.

FIG. 20 is a rear perspective view of the mobile terminal illustrated in FIG. 19.

DETAILED DESCRIPTION OF THE EMBODIMENTS

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1 Conceptual Views of Wireless Power Transmitter and Electronic Device

FIG. 1 is an exemplary view conceptually illustrating a wireless power transmitter and an electronic device according to the embodiments of the present invention.

Referring to FIG. 1, the wireless power transmitter 100 may be a power transfer (or transmitting) apparatus configured to transfer power required for the electronic device 200 in a wireless manner.

Furthermore, the wireless power transmitter 100 may be a wireless charging apparatus configured to charge a battery of the electronic device 200 by transferring power in a wireless manner. A case where the wireless power transmitter 100 is a wireless charging apparatus (or a wireless charging device) will be described later with reference to FIG. 9.

Additionally, the wireless power transmitter 100 may be implemented with various forms of apparatuses transferring power to the electronic device 200 requiring power in a contactless state.

The electronic device 200 is a device that is operable by receiving power from the wireless power transmitter 100 in a wireless manner. Furthermore, the electronic device 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device 200, as described later, may be a mobile communication terminal, (for example, a portable phone, a cellular phone, and a tablet) or multimedia device. In case where the electronic device is a mobile terminal, it will be described later with reference to FIG. 10.

On the other hand, the wireless power transmitter 100 may transfer power in a wireless manner without mutual contact to the electronic device 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the electronic device 200 by the resonance phenomenon.

Hereinafter, the wireless power transmitter 100 and the electronic device 200 according to the embodiments disclosed herein will be described in detail. In assigning reference numerals to the constituent elements in each of the following drawings, the same reference numerals will be used for the same constituent elements even though they are shown in a different drawing.

FIG. 2 is an exemplary block diagram illustrating the configuration of a wireless power transmitter 100 and an electronic device 200 that can be employed in the embodiments disclosed herein.

FIG. 2A Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 may transfer power supplied from a transmission side power supply unit 190 to the electronic device 200 by converting it into a wireless power signal. The wireless power signal transferred by the power conversion unit 111 may be generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method.

In accordance with exemplary embodiments, the power conversion unit 111 may include a primary coil for forming a changing magnetic field to induce a current to a secondary coil of the electronic device 200. Furthermore, the power conversion unit 111 may include a coil (or antenna) for forming a magnetic field having a specific resonant frequency to generate a resonant frequency in the electronic device 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4A, 4B and 5, and those for the resonance coupling method will be described with reference to FIGS. 7A, 7B and 8.

On the other hand, the power conversion unit 111 may further include a circuit for controlling the characteristics of a used frequency, an applied voltage, an applied current or the like to form the wireless power signal.

The power transmission control unit 112 control search of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the electronic device 200 is passed. Next, a semi-active area denotes an interest region in which the wireless power transmitter 100 can detect the existence of the electronic device 200. Here, the power transmission control unit 112 may detect whether the electronic device 200 is placed in the active area or detection area or removed from the area. Specifically, the power transmission control unit 112 may detect whether or not the electronic device 200 is placed in the active area or detection area using a wireless power signal formed from the power conversion unit 111 or a sensor separately provided therein. For instance, the power transmission control unit 112 may detect the presence of the electronic device 200 by monitoring whether or not the characteristic of power for forming the wireless power signal is changed by the wireless power signal, which is affected by the electronic device 200 existing in the detection area. However, the active area and detection area may vary according to the wireless power transfer method such as an inductive coupling method, a resonance coupling method, and the like.

The power transmission control unit 112 may perform the process of identifying the electronic device 200 or determine whether to start wireless power transfer according to a result of detecting the existence of the electronic device 200.

Furthermore, the power transmission control unit 112 may determine a characteristic of at least one of a frequency, a voltage, and a current of the power conversion unit 111 for forming the wireless power signal. The determination of the characteristic may be carried out by a condition at the side of the wireless power transmitter 100 or a condition at the side of the electronic device 200. In exemplary embodiments, the power transmission control unit 112 may decide the characteristic based on device identification information.

In another exemplary embodiment, the power transmission control unit 112 may decide the characteristic based on required power information of the electronic device 200 or profile information related to the required power. The power transmission control unit 112 may receive a power control message from the electronic device 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine a characteristic of at least one of a frequency, a voltage and a current used to form the wireless power signal according to the power control message including at least one of rectified power amount information, charging state information and identification information in the electronic device 200.

Furthermore, as another control operation using the power control message, the wireless power transmitter 100 may perform a typical control operation associated with wireless power transfer based on the power control message. For example, the wireless power transmitter 100 may receive information associated with the electronic device 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the power control message, the wireless power transmitter 100 may further include a modulation/demodulation unit 113 electrically connected to the power conversion unit 111. The modulation/demodulation unit 113 may modulate a wireless power signal that has been modulated by the electronic device 200 and use it to receive the power control message.

In addition, the power transmission control unit 112 may acquire a power control message by receiving user data including a power control message by a communication means (not shown) included in the wireless power transmitter 100.

In accordance with one exemplary embodiment disclosed herein, the wireless power transmitter 100 may supply power to a plurality of electronic devices. In this case, wireless power signals which are modulated by the plurality of electronic devices, respectively, may collide with each other. Therefore, the constituent elements included in the wireless power transmitter 100 may execute various operations for avoiding the collision of the modulated wireless power signals.

In accordance with one exemplary embodiment disclosed herein, the power conversion unit 111 may convert power supplied from the transmitting side power supply unit 190 into a wireless power signal and transfer the wireless power signal to the plurality of electronic devices, respectively. For example, the plurality of electronic devices may be two electronic devices, namely, a first electronic device and a second electronic device.

Also, the power conversion unit 111 may generate a wireless power signal for power transfer and receive a first response signal and a second response signal corresponding to the wireless power signal.

The power transmission control unit 112 may determine whether or not the first response signal and the second response signal collide with each other, and reset the power transfer when it is determined that the first response signal and the second response signal collide with each other.

The first response signal and the second response signal may be generated in a manner that the wireless power signal is modulated by the first device and the second device, respectively.

Also, the power transmission control unit 112 may control the power conversion unit 111 in such a manner that the first response signal and the second response signal, which are generated to avoid collision with each other according to the resetting result of the power transfer, can be received in a sequential manner.

The sequential reception indicates a reception of the first response signal after a first time interval and then the second response signal after a second time interval within a predetermined response period. The first time interval and the second time interval may be decided based on a value obtained by generating random numbers.

The predetermined response period (Tping interval) may be decided to be more than a time which may include both the first response signal and the second response signal, and also decided after resetting the power transfer.

In accordance with one exemplary embodiment disclosed herein, the determination as to whether those signals collide with each other may be carried out according to whether or not the first response signal and the second response signal are decoded using a preset format. The preset format may include a preamble, a header and a message. The determination as to whether or not the first response signal and the second response signal collide with each other may be carried out based on whether or not it is possible to restore the first response signal and the second response signal because an error is generated due to collision in at least one of the preamble, the header and the message.

Also, in accordance with one exemplary embodiment disclosed herein, the power conversion unit 111 may receive the response signal of the first device which does not collide with the response signal of the second device periodically within a first response period (Tping interval_1). The power transmission control unit may decode the first response signal and the second response signal using a preset format, and determine whether or not the first response signal and the second response signal collide with each other based on possibility of the decoding. Here, the first response signal and the second response signal may be received periodically within a second response period (Tping interval_2). The second response period (Tping interval_2) may be decided to be more than a time, which may include both the first response signal and the second response signal, and also decided after resetting the power transfer.

FIG. 2B Electronic Device

Referring to FIG. 2B, the electronic device 200 may include a power supply unit 290. The power supply unit 290 supplies power required for the operation of the electronic device 200. The power supply unit 290 may include a power receiving unit 291 and a power reception control unit (or POWER RECEIVING CONTROL UNIT) 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4A or 4B, and those for the resonance coupling method with reference to FIG. 7A or 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through the wireless power signal. In another exemplary embodiment, the power reception control unit 292 may transmit the power control message through a method for transmitting user data.

In order to transmit the power control message, the electronic device 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the power reception control unit 292 may control the power communications modulation/demodulation unit 293 at the side of the electronic device 200 to modulate the wireless power signal. For instance, the power reception control unit 292 may perform a modulation process such that a power amount received from the wireless power signal is varied by changing a reactance of the modulation/demodulation unit 293 connected to the power receiving unit 291. The change in a power amount received from the wireless power signal may result in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the electronic device (or wireless power receiver) 200.

In addition, the power supply unit 290 may further include a charger (or charging unit) 298 and a battery 299.

The electronic device 200 receiving power for operation from the power supply unit 290 may be operated by power transferred from the wireless power transmitter 100, or operated by charging the battery 299 using the transferred power and then receiving the charged power. At this time, the power reception control unit 292 may control the charger (or charging unit) 298 to perform charging using the transferred power.

In accordance with one exemplary embodiment disclosed herein, a plurality of electronic devices may receive power transferred from the wireless power transmitter 100. In this case, wireless power signals which are modulated by the plurality of electronic devices may collide with each other. Therefore, the constituent elements included in the wireless power transmitter 100 may execute various operations for avoiding the collision of the modulated wireless power signals.

In accordance with one exemplary embodiment, the power receiving unit 291 may receive a wireless power signal for power transfer from the wireless power transmitter.

Here, the power reception control unit 292 may control the power receiving unit 291 to transmit a third response signal, corresponding to the wireless power signal, after a time interval set for a first time within a first response period (Tping interval_1).

In accordance with one exemplary embodiment, the power reception control unit 292 may determine whether or not the power transfer of the wireless power transmitter 100 has been reset due to the collision of the modulated wireless power signals, and set the time interval to a second time when the power transfer has been reset based on the determination result.

In accordance with one exemplary embodiment disclosed herein, the power reception control unit 292 may control the power receiving unit 291 to transmit a fourth response signal, corresponding to the wireless power signal, after the time interval set for the second time within a second response period (Tping interval_2). The second time may be decided based on a value obtained by generating random numbers.

Hereinafter, description will be given of a wireless power transmitter and an electronic device to which exemplary embodiments disclosed herein is applicable.

First, a method of allowing the wireless power transmitter to transfer power to the electronic device according to an inductive coupling method will be described with reference to FIGS. 3 through 5.

FIG. 3 Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the electronic device 200 may include a receiving (Rx) coil 2911*a* being operated as a secondary coil in magnetic induction.

First, the wireless power transmitter 100 and the electronic device 200 may be disposed in such a manner that the transmitting (Tx) coil 1111*a* at the side of the wireless power transmitter 100 and the receiving coil at the side of the electronic device 200 are located adjacent to each other. Then, if the power transmission control unit 112 controls a current of the transmitting (Tx) coil 1111*a* to be changed, then the power receiving unit 291 may control power to be supplied to the electronic device 200 using an electromotive force induced to the receiving (Rx) coil 2911*a*.

The efficiency of wireless power transfer by the inductive coupling method may be little affected by a frequency characteristic, but affected by an alignment and distance between the wireless power transmitter 100 and the electronic device 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting (Tx) coil 1111*a* may be mounted at a lower portion of the interface surface. In this case, a vertical spacing is formed in a small-scale between the transmitting (Tx) coil 1111*a* mounted at a lower portion of the interface surface and the receiving (Rx) coil 2911*a* of the electronic device 200 placed a tan upper portion of the interface surface, and thus a distance between the coils becomes sufficiently small to efficiently implement contactless power transfer by the inductive coupling method.

Furthermore, an alignment indicator (not shown) indicating a location where the electronic device 200 is to be placed may be disposed at an upper portion of the interface surface. The alignment indicator may indicate a location of the electronic device 200 where an alignment between the transmitting (Tx) coil 1111*a* mounted at a lower portion of the interface surface and the receiving (Rx) coil 2911*a* can be suitably implemented. The alignment indicator may alternatively be simple marks, or may be formed in the form of a protrusion structure for guiding the location of the electronic device 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 may be formed to include one or more transmitting coils. The wireless power transmitter 100 may selectively use some of coils suitably arranged with the receiving (Rx) coil 2911*a* of the electronic device 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

FIGS. 4A and 4B Wireless Power Transmitter and Electronic Device Using Inductive Coupling Method FIG. 4 is a block diagram illustrating part of the wireless power transmitter 100 and the electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 may include a transmitting (Tx) coil 1111*a* and an inverter 1112.

The transmitting (Tx) coil 1111*a* may form a magnetic field corresponding to the wireless power signal according to a change of current as described above. The transmitting (Tx) coil 1111*a* may alternatively be implemented with a planar spiral type or cylindrical solenoid type.

The inverter 1112 may transform a DC input obtained from the power supply unit 190 into an AC waveform. The AC current transformed by the inverter 1112 may drive a resonant circuit including the transmitting (Tx) coil 1111*a* and a capacitor (not shown) to form a magnetic field in the transmitting (Tx) coil 1111*a*.

In addition, the power conversion unit 111 may further include a positioning unit 1114.

The positioning unit 1114 may move or rotate the transmitting (Tx) coil 1111*a* to enhance the effectiveness of contactless power transfer using the inductive coupling method. As described above, it is because an alignment and distance between the wireless power transmitter 100 and the electronic device 200 including a primary coil and a secondary coil may affect power transfer using the inductive coupling method. In particular, the positioning unit 1114 may be used when the electronic device 200 does not exist within an active area of the wireless power transmitter 100.

Accordingly, the positioning unit 1114 may include a drive unit (not shown) for moving the transmitting (Tx) coil 1111*a* such that a center-to-center distance of the transmitting (Tx) coil 1111*a* of the wireless power transmitter 100 and the receiving (Rx) coil 2911*a* of the electronic device 200 is within a predetermined range, or rotating the transmitting (Tx) coil 1111a such that the centers of the transmitting (Tx) coil 1111a and the receiving (Rx) coil 2911a are overlapped with each other.

For this purpose, the wireless power transmitter 100 may further include a detection unit (not shown) made of a sensor for detecting the location of the electronic device 200, and the power transmission control unit 112 may control the positioning unit 1114 based on the location information of the electronic device 200 received from the location detection sensor.

Furthermore, to this end, the power transmission control unit 112 may receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 may monitor a current or voltage flowing into the transmitting (Tx) coil 1111a. The power sensing unit 1115 may be provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting (Tx) coil 1111a.

Referring to FIG. 4B, the power supply unit 290 of the electronic device 200 may include a receiving (Rx) coil 2911a and a rectifier (or rectifying) circuit 2913.

A current may be induced into the receiving (Rx) coil 2911a by a change of the magnetic field formed in the transmitting (Tx) coil 1111a. The implementation type of the receiving (Rx) coil 2911a may be a planar spiral type or cylindrical solenoid type similarly to the transmitting (Tx) coil 1111a.

Furthermore, series and parallel capacitors may be configured to be connected to the receiving (Rx) coil 2911a to enhance the effectiveness of wireless power reception or perform resonant detection.

The receiving (Rx) coil 2911a may be in the form of a single coil or a plurality of coils.

The rectifier circuit 2913 may perform a full-wave rectification to a current to convert alternating current into direct current. The rectifier circuit 2913, for instance, may be implemented with a full-bridge rectifier generation circuit made of four diodes or a circuit using active components.

In addition, the rectifier circuit 2913 may further include a regulator circuit for converting a rectified current into a more flat and stable direct current. Furthermore, the output power of the rectifier circuit 2913 may be supplied to each constituent element of the power supply unit 290. Furthermore, the rectifier circuit 2913 may further include a DC-DC converter for converting output DC power into a suitable voltage to adjust it to the power required for each constituent element (for instance, a circuit such as a charger (or charging unit) 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the electronic device 200 monitors a voltage and/or current of the power rectified by the rectifier circuit 2913, and if the voltage and/or current of the rectified power exceeds a threshold value as a result of monitoring, then the power reception control unit 292 transmits a power control message to the wireless power transmitter 100 to transfer suitable power.

FIG. 5 Wireless Power Transmitter Including One or More Transmitting Coils

FIG. 5 is a block diagram illustrating a wireless power transmitter configured to have one or more transmitting coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the electronic device 200 placed at an upper portion of the interface surface, the power transmission control unit 112 may take the detected location of the electronic device 200 into consideration to control the multiplexer 1113, thereby allowing coils that can be placed in an inductive coupling relation to the receiving (Rx) coil 2911a of the electronic device 200 among the one or more transmitting coils 1111a-1 to 1111a-n to be connected to one another.

For this purpose, the power transmission control unit 112 may acquire the location information of the electronic device 200. For example, the power transmission control unit 112 may acquire the location of the electronic device 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device 200.

On the other hand, the active area as part of the interface surface may denote a portion through which a magnetic field with a high efficiency can pass when the wireless power transmitter 100 transfers power to the electronic device 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the electronic device 200, and establish the connection of a primary cell corresponding to the active area to control the multiplexer 1113, thereby allowing the receiving (Rx) coil 2911a of the electronic device 200 and the coils belonging to the primary cell to be placed in an inductive coupling relation.

In the meantime, upon disposing one or more electronic devices 200 on an interface surface of the wireless power transmitter 100, which includes the one or more transmitting coils 1111a-1 to 1111a-n, the power transmission control unit 112 may control the multiplexer 1113 to allow the coils belonging to the primary cell corresponding to the position of each electronic device to be placed in the inductive coupling relation. Accordingly, the wireless power transmitter 100 may generate the wireless power signal using different coils, thereby transferring it to the one or more electronic devices in a wireless manner.

Also, the power transmission control unit 112 may set power having a different characteristic to be supplied to each of the coils corresponding to the electronic devices. Here, the wireless power transmitter 100 may transfer power by differently setting a power transfer scheme, efficiency, characteristic and the like for each electronic device.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

FIG. 6 Resonance Coupling Method

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency may be formed by alternating current power in the power transmission unit 110. If a resonance phenomenon occurs in the electronic device 200 by the formed magnetic field, then power may be generated by the resonance phenomenon in the electronic device 200.

However, if the plurality of vibrating bodies resonate with each other in an electro-magnetic manner as aforementioned, extremely high power transmission efficiency may be exhibited due to non-affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. This may be referred to as magnetic coupling or magnetic resonance. The magnetic resonance may be generated when the wireless power transmitter 100 and the electronic device 200 are located within the single wavelength of the electromagnetic wave having the low frequency.

Also, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting (Tx) coil 1111b of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit (or RESONANT GENERATION CIRCUIT) 1116 connected to the transmitting (Tx) coil 1111b to determine a specific vibration frequency. The resonant circuit 1116 may be implemented by using a capacitive circuit (capacitors), and the specific vibration frequency may be determined based on an inductance of the transmitting (Tx) coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting (Tx) coil 1111b as illustrated in FIG. 6.

Furthermore, the power receiving unit 291 of the electronic device 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have LTx, CTx, and may be acquired by using the Equation 1. Here, the electronic device (or wireless power receiver) 200 may generate resonance when a result of substituting the LRx and CRx of the electronic device (or wireless power receiver) 200 to the Equation 1 is same as the specific vibration frequency.

According to a contactless power transfer method by resonance coupling, when the wireless power transmitter 100 and electronic device 200 resonate at the same frequency, respectively, an electromagnetic wave may be propagated through a short-range magnetic field, and thus there may exist no energy transfer between the devices if they have different frequencies.

As a result, efficiency of contactless power transfer by the resonance coupling method may be greatly affected by a frequency characteristic, whereas the effect of an alignment and distance between the wireless power transmitter 100 and the electronic device 200 including each coil may be relatively smaller than the inductive coupling method.

Hereinafter, the configuration of a wireless power transmitter and an electronic device in the resonance coupling method applicable to the embodiments disclosed herein will be described in detail.

FIGS. 7A and 7B Wireless Power Transmitter Using Resonance Coupling Method FIGS. 7A and 7B are block diagrams illustrating part of the wireless power transmitter 100 and the electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit (or RESONANT GENERATION CIRCUIT) 1116. The inverter 1112 may be configured to be connected to the transmitting (Tx) coil 1111b and the resonant circuit 1116.

The transmitting (Tx) coil 1111b may be mounted separately from the transmitting (Tx) coil 1111a for transferring power according to the inductive coupling method, but may transfer power in the inductive coupling method and resonance coupling method using one single coil.

The transmitting (Tx) coil 1111b, as described above, may form a magnetic field for transferring power. The transmitting (Tx) coil 1111b and the resonant circuit 1116 may generate vibration when alternating current power is applied thereto, and at this time, a vibration frequency may be determined based on an inductance of the transmitting (Tx) coil 1111b and a capacitance of the resonant circuit 1116.

For this purpose, the inverter 1112 may transform a DC input obtained from the power supply unit 190 into an AC waveform, and the transformed AC current may be applied to the transmitting (Tx) coil 1111b and the resonant circuit 1116.

In addition, the power conversion unit 111 may further include a frequency adjustment unit 1117 for changing a resonant frequency of the power conversion unit 111. The resonant frequency of the power conversion unit 111 may be determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting (Tx) coil 1111b to change an inductance, or include active elements for determining the capacitance and/or inductance.

On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, may include the receiving (Rx) coil 2911b and resonant circuit 2912.

In addition, the power receiving unit 291 of the power supply unit 290 may further include a rectifier (or rectifying) circuit 2913 for converting an AC current generated by resonance phenomenon into DC. The rectifier circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

FIG. 8 Wireless Power Transmitter Including One or More Transmitting Coils

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant (or RESONANT GENERATION) circuits 1116-1 to 1116-n connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same resonant frequency, or some of them may be configured to have different resonant frequencies. It may be determined by an inductance and/or capacitance of the resonant circuits 1116-1 to 1116-n connected to the one or more transmitting coils 1111b-1 to 1111b-n, respectively.

In the meantime, when one or more electronic devices 200 are disposed in an active area or a detection area of the wireless power transmitter 100 including the one or more transmitting coils 1111b-1 to 1111b-n, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices. Here, the wireless power transmitter 100 may transfer power by differently setting a power transmission scheme, a resonant frequency, efficiency, a characteristic and the like for each electronic device.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

FIG. 9 Wireless Power Transmitter Implemented as Charger

Hereinafter, an example of the wireless power transmitter implemented in the form of a wireless charger will be described.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit (or a controller) 180 in addition to the power transmission unit 110 and power supply unit 190 for supporting at least one of the foregoing inductive coupling method and resonance coupling method.

The controller 180 controls the power transmission unit 110, the sensor unit 120, the communication unit 130, the output unit 140, the memory 150, and the power supply unit 190.

The control unit (or Controller) 180 may be implemented by a module separated from the power transmission control unit 112 in the power transmission unit 110 described with reference to FIG. 2 or may be implemented by a single module.

The sensor unit 120 may include a sensor for detecting the location of the electronic device 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting (Tx) coil 1111a in the power transmission unit 110.

Furthermore, for example, the wireless power transmitter 100 may be configured to include the foregoing one or more transmitting coils may determine coils that can be placed in an inductive coupling relation or resonance coupling relation to the receiving coil of the electronic device 200 among the one or more transmitting coils based on the location information of the electronic device 200.

On the other hand, the sensor unit 120 may be configured to monitor whether or not the electronic device 200 approaches a chargeable region. The approach or non-approach detection function of the sensor unit 120 may be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display 341 and an audio output unit (or SOUND OUTPUT UNIT) 142. The display 341 may include at least one of a liquid crystal display (LCD), a thin film transistor-liquid crystal display (TFT-LCD), an organic light-emitting diode (OLED), a flexible display, and a three-dimensional (3D) display. The display 341 may display a charging state under the control of the control unit (or controller) 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet. A program or commands performing the foregoing functions of the wireless power transmitter 100 may be stored in the memory 150. The controller 180 may perform the program or commands stored in the memory 150 to transmit power in a wireless manner. A memory controller (not shown) may be used to allow other constituent elements (e.g., controller 180) included in the wireless power transmitter 100 to access the memory 150.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

FIG. 10 Wireless Power Receiver Implemented as Mobile Terminal

FIG. 10 is view illustrating a configuration in case where an electronic device 200 according to the embodiments disclosed herein is implemented in the form of a mobile terminal.

The mobile communication terminal 200 may include a power supply unit 290 illustrated in FIG. 2A, 2B, 4A, 4B, 7A or 7B.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 may receive a broadcast signal and/or broadcast associated information from an external broadcast managing entity via a broadcast channel.

The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this case, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 may transmit/receive wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 may support wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 may denote a module for short-range communications. Suitable technologies for implementing this module may include Bluetooth, Radio Frequency IDentification (RFID), Infrared Data Association (IrDA), Ultra-WideBand (UWB), ZigBee®, and the like. On the other hand, Universal Serial Bus (USB), IEEE 1394, Thunderbolt of Intel technology, and the like, may be used for wired short-range communication.

The wireless internet module 213 or the short-range communication module 214 may establish data communication connection to the wireless power transmitter 100.

Through the established data communication, when there is an audio signal to be outputted while transferring power in a wireless manner, the wireless internet module 213 or the short-range communication module 214 may transmit the audio signal to the wireless power transmitter 100 through the short-range communication module. Furthermore, through the established data communication, when there is information to be displayed, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100. Furthermore, the wireless internet module 213 or the short-range communication module 214 may transmit the identification information (e.g., phone number or device name in case of a portable phone) of the mobile terminal 200 to the wireless power transmitter 100 through the established data communication.

The position location module 215 is a module for acquiring a position of the terminal. An example of the position location module 215 may include a Global Position System (GPS) module.

Referring to FIG. 10, the A/V input unit 220 may be configured to provide audio or video signal input to the portable terminal. The A/V input unit 220 may include a camera 221 and a microphone 222. The camera 221 may process image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 may receive an external audio signal by a microphone in a phone call mode, a recording mode, a voice recognition mode, or the like to process it into electrical audio data. The processed audio data may be converted and outputted into a format transmittable to a mobile communication base station via the mobile communication module 212 in case of the phone call mode. The microphone 222 may include various noise removal algorithms to remove noises generated while receiving the external audio signal.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 may detect an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal outputted from the pressure sensor 242. Furthermore, it may be possible to know a size of the pressure applied to the display unit 251 during the input of a pressure touch.

The motion sensor 243 may detect the location or movement of the mobile terminal 200 using an acceleration sensor, a gyro sensor, and the like. The acceleration sensor used in the motion sensor 243 may be an element for converting an acceleration change in any one direction into an electrical signal. Two or three axes may be typically integrated into a package to constitute an acceleration sensor, and only one Z-axis may be required according to the use environment. Accordingly, when an acceleration sensor in the direction of X-axis or Y-axis should be used instead of the direction of Z-axis due to any reason, the acceleration sensor may be erected and mounted on a main substrate using a separate piece substrate. Furthermore, the gyro sensor may be a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 may be provided to output visual, auditory, or tactile information. The output unit 250 may include a display unit 251, an audio output module 252, an alarm unit 253, a haptic module 254, and the like.

The display unit 251 may display (output) information processed in the terminal 200. For example, when the terminal is in a phone call mode, the display unit 251 may provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like.

Some of those displays may be configured as a transparent type or a light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces.

Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also a touch pressure.

When touch inputs are sensed by the touch sensors, corresponding signals may be sent to a touch controller. The touch controller may process the received signals, and then transmit corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor may have a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor may sense proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm unit 253 may output signals notifying the occurrence of an event from the terminal 200. The event occurring from the terminal 100 may include call received, message received, key signal input, touch input, and so on. The alarm unit 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm unit 253.

The haptic module 254 may generate various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 may generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phonebook data, messages, still images, video and the like). Also, the memory 260 may store data related to various patterns of vibrations and audio output upon the touch input on the touch screen.

In some embodiments, software components including an operating system (not shown), a module performing a wireless communication unit 210 function, a module operating together with the user input unit 230, a module operating together with the A/V input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280.

Furthermore, the memory 260 may store an application associated with contactless power transfer (or wireless charging) downloaded from an application providing server (for example, an app store). The wireless charging related application may be a program for controlling wireless charging transmission, and thus the electronic device 200 may receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 160 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as 'identification device') maybe implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals inputted from the cradle by a user to the terminal 200. Such various command signals or power inputted from the cradle may operate as signals for recognizing that the terminal 200 has accurately been mounted to the cradle.

The controller 280 may typically control the overall operations of the terminal 200. For example, the controller 280 may perform the control and processing associated with telephony calls, data communications, video calls, and the like. The controller 280 may include a multimedia module 281 for multimedia playback. The multimedia module 281 may be implemented within the controller 280, or implemented separately from the controller 280. Also, the controller 180 may be implemented as a separate module from the power reception control unit 292 within the power supply unit 290, which has been described with reference to FIG. 2A or 2B, or a single module.

The controller 280 can perform a pattern recognition processing so as to recognize a writing input or image drawing input carried out on the touch screen as a text or image.

The controller 280 may perform wired or wireless charging according to the user input or internal input. Here, the internal input may represent a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the power reception control unit 292 within the power supply unit 290 may be implemented to be included in the controller 280, and in the present disclosure, it should be understood that the controller 280 performs the operation by the Power reception control unit 292.

The power supply unit 290 may receive internal and external power under the control of the controller 280 to supply power required for the operation of each constituent element.

The power supply unit 290 may be provided with a battery 299 for supplying power to each constituent element of the terminal 200, and the battery 299 may include a charger (or charging unit) 298 for performing wired or wireless charging.

The present disclosure discloses a mobile terminal as an example of the apparatus for receiving power in a wireless manner, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

FIG. 11 is a front perspective view of a wireless power transmitter in accordance with one exemplary embodiment disclosed herein.

A body 303 of the wireless power transmitter 300 may include a case (casing, housing, or cover) defining an appearance. In this exemplary embodiment, the case may be divided into a frontcase 301 and a rear case 302. A space formed between the front and rear cases 301 and 302 may accommodate various electronic components. At least one intermediate case may further be disposed between the front and the rear cases 301 and 302.

Such cases may be injected using a synthetic resin or be formed of a metal, such as stainless steel (STS), titanium (Ti) or the like.

The body may be shown, having an output unit such as a display unit or an audio output module, a user input unit, a socket 389 allowing for supplying power to the body, an interface (not illustrated) coupled to an external device, or the like.

The display 341 may be formed on an upper surface of the front case 301. The user input unit 360 and the socket 389 may be disposed on side surfaces of the front case 301 and the rear case 302.

The user input unit 360 may be manipulated to allow inputting of commands for controlling operations of the mobile terminal 100, and include a plurality of manipulation units 361 and 362. The plurality of manipulation units 361 and 362 may be referred to as a manipulating portion. Such manipulating portion can employ any tactile manner that a user can touch or tap for manipulation.

The first and second manipulation units 361 and 362 may be set to allow inputting of various contents. For example, the first manipulation unit 361 may be configured to input commands such as start or end of charging, and the second manipulation unit 362 may be configured to input commands, such as a volume adjustment of sounds output from the audio output module 342, a brightness adjustment of the display 341, or the like.

A mounting surface 301a, on which the electronic device 200 as a target to be charged is placed, may be formed on the upper surface of the body 303. When the electronic device 200 is placed on the mounting surface 301a, a sensor included in the body 303 may sense it and wireless charging may be started.

FIG. 12 is an exploded perspective view of FIG. 11.

As illustrated in FIG. 12, a transmitting coil unit 370, a printed circuit board 355 and a blowing module may be disposed in a space formed by the front case 301 and the rear case 302.

The transmitting coil unit 370, as aforementioned, may transmit a signal such that power can be transferred to the electronic device 200 in a wireless manner when the electronic device 200 is placed on the mounting surface 301a.

The transmitting coil unit 370 may include a fixing plate 372, and a coil 371. The transmitting coil unit 370 may be fixed to the rear case 302 by the fixing plate 372. The fixing plate 372 may be formed by including a material with high heat conductivity, and accordingly discharge heat generated from the coil 371 to the outside of the rear case 302. A part of the rear case 302 obscured by the fixing plate 372 may include at least one opening for facilitating radiation of heat from the fixing plate 372.

The coil 371 may be formed in a shape that at least one conducting wire is wound around a cylindrical body. A magnet 373 may also be disposed on an inner circumference of the cylindrical coil according to a wireless charging method.

The printed circuit board 355 may be disposed adjacent to the transmitting coil unit 370. The printed circuit board 355 may include various elements, to generate a wireless power signal when power is applied. The wireless power signal may then be transmitted to the transmitting coil unit 370. The printed circuit board 355 may include at least one element constructing a power conversion unit, a power transmission control unit or a modulation/demodulation unit for the generation of the wireless power signal.

The blowing module may allow a fluid to be discharged toward a guide module so as to cool the interior. As one example, the blowing module may be configured such that a fan is installed in a housing and rotated by a motor to discharge a fluid.

When charging an electronic device having a receiving coil therein, a user may place the electronic device on a wireless power transmitter (or a charger). A space where charging efficiency more than a predetermined level is obtained on the wireless power transmitter may be a limited area formed on a transmitting coil. When the electronic device is out of the area, the charging efficiency may be reduced.

The present disclosure provides a wireless power transmitter, which is capable of extending a charging area to ensure charging efficiency more than a predetermined level even when a user places an electronic device on an area with reduced charging efficiency or when the electronic device is moved out of a predetermined area while charging is ongoing. Hereinafter, it will be described in detail with reference to the accompanying drawings.

As illustrated in FIG. 12, the transmitting coil unit 370 may be embedded in the body. A shaft 381 which penetrates through the transmitting coil unit 370 may be connected to a driving unit 382. The driving unit 382 may include a motor for rotating the shaft 381. Since the shaft 381 and the transmitting coil unit 370 are coupled to each other, the transmitting coil unit 370 may also be rotatable in response to the rotation of the shaft 381. The shaft 381 may be located at a center of the transmitting coil unit 370. Unlike this, the shaft 381 may also be disposed with being spaced from the center of the transmitting coil unit 370.

When the transmitting coil unit 370 is rotated, a conducting wire which connects an inverter and the transmitting coil unit 370 to each other may be twisted. To prevent this, the conducting wire may penetrate through the shaft 381 so as to connect the inverter and the transmitting coil unit 370 to each other. Contact portions which are rotated and also come in contact with the inverter or the transmitting coil unit 370 may be formed on both sides of the conducting wire. The contact portion, for example, may be formed in a spherical or annular shape. This may prevent the twisting of the conducting wire even though the transmitting coil unit 370 is rotated.

A sensing unit 390 may be formed on the transmitting coil unit 370. The sensing unit 390 may sense a position of a receiving coil unit 450. The sensing unit 390 may include a substrate, and sensing coils 391 formed on the substrate. The substrate may be disposed to obscure most of the body where the electronic device is placed. Accordingly, a position of the receiving coil unit 450 may be sensed by the sensing unit 390, irrespective of the position where the receiving coil unit 450 is located.

One surface of the substrate may be divided into a plurality of areas, and the sensing coils 391 may be disposed on the respective areas. When a current is applied to the transmitting coil unit 370, an induced current may be generated in the receiving coil unit 450. The sensing coils 391 may generate an induced current by the current generated in the receiving coil unit 450. The sensing coils 391 which are provided in plurality with spacing from each other may sense the position of the receiving coil unit 450 through the current generated in the receiving coil unit 450. That is, since the receiving coil unit 450 is located on the sensing coils 391, on which the induced current by the receiving coil unit 450 is flowing, positions of the sensing coils 391 on which the induced current flows may be defined as the position of the receiving coil unit 450. When the induced current flows along the plurality of sensing coils 391, magnitudes of the currents flowing along each of the plurality of sensing coils 391 may be compared, and a portion on which the largest current flows may be defined as the position of the receiving coil unit 450.

Also, the position of the receiving coil unit 450 may be decided in a manner of applying a current to each of the sensing coils 391 and measuring sizes of impedance. This is because the impedance sensed by the sensing coil 391 is changed when receiving coils are disposed adjacent to each other. Even in this case, positions of the sensing coils 391 having the greatest impedance change, among the sensing coils 391, may be decided as the position of the receiving coil unit 450.

Another method of deciding a position of the receiving coil unit 450 using an impedance value may be employed. As one example, an impedance value of the transmitting coil unit 370 may be changed according to positions of the receiving coil unit 450 and the transmitting coil unit 370. Here, after an impedance range of the transmitting coil unit 370 having the highest charging efficiency is decided, the transmitting coil unit 370 may be rotated using the driving unit 382 such that the impedance of the transmitting coil unit 370 can be present within the impedance range. That is, when the sensing unit 390 senses the impedance of the transmitting coil unit 370 and the sensed impedance is out of the impedance range of the transmitting coil unit 370 having the highest charging efficiency, the driving unit 382 may rotate the transmitting coil unit 370 such that the impedance of the transmitting coil unit 370 can enter the range.

A controller may be configured to transmit a control signal to the driving unit 382. The controller may control the driving unit 382 to rotate the shaft 381 by a predetermined angle. Accordingly, the transmitting coil unit 370 connected to the shaft 381 may be rotated. The controller may be formed in a form of a microcomputer mounted onto the printed circuit board.

The controller may transmit a control signal to the driving unit 382 based on a realtime input signal. An electronic device may be unexpectedly moved while it is charged, thereby being out of a charging area with sufficient efficiency. In this case, even though the user has not recognized it, the controller may control the driving unit 382, based on an input signal, to handle the wireless power transmitter in such a manner that the wireless power transmitter can exhibit charging efficiency more than a predetermined level while the charging is carried out.

The following embodiments merely illustrate a transmitting coil with respect to the transmitting coil unit 370 for convenience.

FIGS. 13A and 13B are usage-state views of a wireless power transmitter and a wireless power receiver according to a comparative embodiment.

As illustrated, a charging area may be formed around the transmitting coil unit 370. Here, when a receiving coil unit 450 of an electronic device is moved away from a charging area, charging efficiency may be drastically reduced. The electronic device may be placed on an area out of the charging area due to a user's carelessness, and also the electronic device may get out of the charging area in a state that the user has not recognized it during the charging. For instance, the electronic device may be moved out of the charging area because a pet or a child touches it.

FIGS. 14A and 14B are usage-state views of a wireless power transmitter and a wireless power receiver according to an exemplary embodiment disclosed herein.

As illustrated, a charging area may be formed around the transmitting coil unit 370. The charging area may extend when the transmitting coil unit 370 is rotated. And, if a position of the receiving coil unit 450 is sensed by the sensing unit 390 and the transmitting coil unit 370 is moved close to the receiving coil unit 450, charging efficiency can be enhanced. That is, when the controller rotates the transmitting coil unit 370 based on a signal received through the sensing unit 390, the transmitting coil unit 370 may be moved to a position corresponding to the position of the receiving coil unit 450 although the receiving coil unit 450 gets out of an area with high charging efficiency, thereby increasing the charging efficiency.

FIGS. 15A and 15B are usage-state views of a wireless power transmitter 500 and a wireless power receiver according to another exemplary embodiment disclosed herein.

Unlike the foregoing embodiments, a transmitting coil unit 570 may include a second coil which receives induced power transmitted from a first coil. The first coil may be connected to an inverter and transmit wired power to the second coil.

In such a manner, when the transmitting coil unit 570 which has received the induced power from the first coil is rotated, the charging area can be increased. That is, a position where the receiving coil unit 450 is disposed may be sensed by a sensing unit 590 and the transmitting coil unit 570 may be moved close to the receiving coil unit 450, so as to enhance the charging efficiency of the wireless power transmitter.

FIGS. 16A to 16D are views illustrating a shape of a coil and an arrangement of a shaft in accordance with each exemplary embodiment disclosed herein.

As illustrated in FIG. 16A, a coil 371 may have a shape of a ring with a cavity. Here, an inner circumference of the ring may be circular. The shaft 381 may be located at a position inclined to one side at the inner circumference of the coil 371. Upon rotation centering on the shaft 381, a radius R1 of a charging area may correspond from the shaft 381 to an outer side of the coil 371 which is the farthest from the shaft 381. Therefore, a greater charging area may be ensured than that when the transmitting coil unit is fixed.

As illustrated in FIG. 16B, a coil 371' may have a shape of a ring. Here, an inner circumference of the ring may be oval. The shaft 381 may be located at a position inclined to one side at the inner circumference of the coil 371'. Upon rotation centering on the shaft 381, a radius R2 of a charging area may correspond from the shaft 381 to an outer side of the coil 371' which is the farthest from the shaft 381. Therefore, a greater charging area may be ensured than that of the circular coil 371 illustrated in FIG. 16A.

As illustrated in FIG. 16C, a coil 371'' may have a shape of a ring. Here, an inner circumference of the ring may be oval. The shaft 381 may be disposed at a center of an inner circumference of the coil 371''. Since the coil 371'' has the oval shape, a greater charging area may be ensured in the aspect that a semi-major R3 of the oval coil is longer than a radius of a circular coil. Also, even when a receiving coil is located adjacent to a semi-minor, charging efficiency can be enhanced by rotating the transmitting coil unit 370.

Since a central area of the coil is wider than that of the circular coil, if a center of a receiving side coil and a center of a transmitting side coil are aligned with each other, higher charging efficiency can be acquired.

As illustrated in FIG. 16D, a coil 371''' may have a shape in which two rings are adhered to each other at one side thereof. Similar to the coil illustrated in FIG. 16C, since a semi-major R4 of a coil 371 is longer, a greater charging area may be formed. Also, since the coil 371''' has a wider central area than the circular coil, if a center of a receiving side coil and a center of a transmitting side coil are aligned with each other, higher charging efficiency can be acquired.

FIG. 17 is a conceptual view illustrating an example of a transmitting coil unit.

To explain an operation of the transmitting coil unit 370 according to the present disclosure, as illustrated in FIG. 17A, a receiving side coil 450 of an electronic device 400 may be located at a position spaced from a transmitting side coil. Due to being far apart from a charging area, charging efficiency may be lowered. This situation may occur at a start time point of charging or even during the charging.

The sensing unit 390 of the wireless power transmitter 300 may sense a position of the receiving coil unit 450 or sense impedance of the transmitting coil unit 370.

When the position of the receiving coil unit 450 is sensed, as illustrated in FIG. 17A, the transmitting coil unit 370 may be rotated to align centers of the receiving side coil and the transmitting side coil with each other. Or, the transmitting coil unit 370 may be rotated such that the centers of the receiving side coil and the transmitting side coil can be as close as possible.

On the other hand, when the sensing unit 390 senses the impedance of the transmitting coil unit 370, the transmitting coil unit 370 may be rotated to enter an impedance range of the transmitting coil unit 370 with the highest charging efficiency. Here, the impedance may be measured in a manner of rotating the transmitting coil unit 370 little by little by a predetermined angle. For instance, when an impedance measured by rotating the transmitting coil unit 370 by a first angle is out of the impedance range of the transmitting coil unit 370 having the highest charging efficiency, the transmitting coil unit 370 may be rotated again by a second angle. With the gradual rotation by the predetermined angles, the transmitting coil unit 370 may enter the impedance range with the highest charging efficiency. Accordingly, the center of the receiving side coil and the center of the transmitting side coil can be aligned with each other or be the closest to each other.

FIG. 18 is a front perspective view of a wireless power transmitter in accordance with another exemplary embodiment disclosed herein.

At least part of a body of a wireless power transmitter may be formed to be transparent. A transmitting side coil 370 in the wireless power transmitter may be visible through the transparent body. This may allow a user to place an electronic device on a position with high charging efficiency while viewing the transmitting side coil.

A display 341 may be formed on one surface of the body of the wireless power transmitter. The display unit may display a level of the charging efficiency. The display may be implemented as a small-sized LCD device so as to output the charging efficiency using numbers. Also, the display may be implemented as a small-sized LED display to output a preset color according to charging efficiency.

The user may check the charging efficiency through the display unit, and thus place the electronic device (for example, a mobile terminal) on an appropriate position.

FIG. 19 is a front perspective view of a mobile terminal in accordance with one exemplary embodiment disclosed herein. FIG. 20 is a rear perspective view of the mobile terminal illustrated in FIG. 19.

Hereinafter, a mobile terminal will be described as an example of an electronic device charged by a wireless power transmitter in a wireless manner.

As illustrated in FIGS. 19 and 20, a mobile terminal 400 may have a bar-type terminal main body 404. Here, the present disclosure may not be limited to the type, but applicable to various structures, such as a slide type, a folder type, a swing type and the like, each of which has two or more bodies coupled to be relatively movable. In addition, the mobile terminal 400 disclosed herein may also be applied to random portable electronic devices having a camera and a flash, for example, a mobile phone, a smart phone, a notebook computer, a digital broadcasting terminal, a personal digital assistant (PDA), portable multimedia player (PMO), and the like.

The mobile terminal 400 disclosed herein may include a terminal main body 404 defining an appearance.

A case (casing, housing, cover, etc.) defining the appearance of the terminal main body 404 may be formed by a front case 401, a rear case and a battery case 403. The battery case 403 may cover a rear surface of the rear case.

A space formed between the front and rear cases may accommodate various electronic components. Such cases may be injected using a synthetic resin or be formed of a metal, such as stainless steel (STS), titanium (Ti) or the like.

A front surface of the terminal main body 404 may be shown, having a display unit 410, a first audio output module 411, a front camera 416, a side key 414, an interface unit 415, and a signal input unit 417.

The display unit 410 may include a liquid crystal display (LCD) module, an organic light emitting diodes (OLED) module, an e-paper, and the like, which visually output information. The display unit 410 may include a touch sensing means allowing a touch input. Hereinafter, the display unit 410 having the touch sensing means may be referred to as 'touch screen.' When a touch is applied to any point on the touch screen 410, a content corresponding to the touched point may be input. The contents input in the touching manner may be characters or numbers, or menu items which are instructed or indicated in various modes. The touch sensing means may be light-transmissive such that the display unit can be viewed. And, a structure for enhancing visibility of the touch screen at a bright place may be included. Referring to FIG. 19, the touch screen 410 may occupy most of the front surface of the front case 401.

The first audio output module 411 may be implemented as a receiver to transfer a call sound to a user's ear, or a loud speaker to output various alarm sounds or multimedia reproduction sounds.

The front camera 416 may receive and process image frames of still pictures or video obtained by image sensors in a video call mode or a capturing mode. The processed image frames may be displayed on the display unit 410.

The image frame processed in the front camera 416 may be stored in a memory 160 or externally transmitted through a wireless communication unit 110. At least two front cameras 416 may be provided according to usage environments.

The signal input unit 417 may be manipulated to allow inputting of commands for controlling operations of the mobile terminal 400, and include a plurality of input keys. The input keys may be referred to as a manipulating portion. Such manipulating portion can employ any tactile manner that a user can touch, push, scroll or the like for manipulation.

For example, the signal input unit 417 may be implemented as a dome switch, a touch screen, or a touchpad allowing a user to input a command or information in a pushing or touching manner, or as a jog or wheel rotating a key or a joystick. Contents input by the signal input unit 417 may be set variously, for example, set for start, end, scroll and the like.

A side surface of the front case 401 may be shown, having the side key 414, the interface unit 415 and the audio input unit 413.

The side key 414 may be referred to as a manipulating portion, and allow for an input of a command to control the operation of the mobile terminal 400. The side key 414 can employ any tactile manner that a user can touch or tap for manipulation. Contents input by the side key 414 may be set variously. For example, the side key 414 may be configured to input commands, such as a control of the image input unit 416, 221, a volume adjustment of sounds output from the audio output module 411, a conversion of the display unit 410 into a touch recognition mode, or the like.

The audio input unit 413 may be implemented, for example, into a microphone for receiving user's voice, other sounds and the like.

The interface unit 415 may serve as a path for data exchange between the mobile terminal 400 and external devices. For example, the interface unit 415 may be at least one of wired/wireless earphone ports, ports for short-range communication (e.g., IrDA, Bluetooth, WLAN, etc.), power supply terminals for power supply to the mobile terminal and the like. The interface unit 415 may be a card socket for coupling to external cards, such as a subscriber identity module (SIM), a user identity module (UIM), a memory card for storage of information and the like.

A rear surface of the terminal main body 404 may be shown, having a power supply unit, and a rear camera 421.

A flash 422 and a mirror (not illustrated) may be disposed adjacent to the rear camera 421. The flash may operate in conjunction with the rear camera 421 when taking a picture using the rear camera 421.

The mirror can cooperate with the rear camera 421 to allow a user to photograph himself in a self-portrait mode.

The second camera 421 faces a direction which is substantially opposite to a direction faced by the front camera 416. Also, the rear camera 421 may be a camera having different pixels from those of the camera 416.

For example, the front camera 416 may operate with relatively lower pixels (lower resolution). Thus, the front camera 416 may be useful when a user can capture his face and send it to another party during a video call or the like. On the other hand, the rear camera 421 may operate with relatively higher pixels (higher resolution) such that it can be useful for a user to obtain higher quality pictures for later use. The front and rear cameras 416 and 221 may be installed in the terminal main body 404 to be rotatable or popped up.

The battery may supply power to the mobile terminal 400. The battery may be embedded in the terminal main body 404 or detachably coupled to the exterior of the terminal main body 404.

As illustrated in FIG. 20, a receiving coil unit 450 for receiving power from a transmitting coil unit 370 in a wireless manner may be disposed on the rear surface of the mobile terminal.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180 or the power transmission control unit 112 of the wireless power transmitter 100.

For software implementation, the embodiments such as procedures and functions may be implemented together with separate software modules each of which performs at least one of functions and operations. The software codes can be implemented with a software application written in any suitable programming language. Also, the software codes may be stored in the memory 160 of the wireless power transmitter 100 and executed by the controller 180 or the power transmission control unit 112.

It would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The exemplary embodiments disclosed herein may be applied to an apparatus for transferring power to a wireless power receiver in a wireless manner.

The invention claimed is:

1. A wireless power transmitter comprising:
   a body having a transmitting coil unit embedded therein, and having one surface with a portable electronic device located thereon, the portable electronic device receiving power from the transmitting coil unit in a wireless manner; and
   a driving unit that is configured to rotate the transmitting coil unit centering on a shaft penetrating through the transmitting coil unit, such that the transmitting coil unit is moved close to a receiving coil unit of the portable electronic device, wherein the body has at least part formed transparent such that the transmitting coil unit is visible therethrough.

2. The wireless power transmitter of claim 1, further comprising a sensing unit that is configured to sense a position of the receiving coil unit.

3. The wireless power transmitter of claim 2, wherein the sensing unit comprises:

a substrate having one surface divided into a plurality of areas; and sensing coils disposed on the areas, respectively.

4. The wireless power transmitter of claim 3, further comprising a controller that is configured to transmit a control signal to the driving unit based on a signal received from each of the sensing coils.

5. The wireless power transmitter of claim 4, wherein the controller transmits the control signal to the driving unit at a preset time interval based on the signal received from each of the sensing coils to maintain charging efficiency more than a predetermined level.

6. The wireless power transmitter of claim 1, wherein the body further comprises a display configured to output a level of charging efficiency.

7. The wireless power transmitter of claim 1, wherein the shaft comprises a cavity, through which a conducting wire is inserted, the conducting wire connecting the transmitting coil unit and an inverter to each other.

8. The wireless power transmitter of claim 1, wherein the shaft is located at a position spaced from a center of the transmitting coil unit.

9. The wireless power transmitter of claim 8, wherein the transmitting coil unit has a cross-section in an oval shape.

10. The wireless power transmitter of claim 1, further comprising a first coil connected to an inverter, wherein the transmitting coil unit comprises a second coil receiving induced power from the first coil.

11. The wireless power transmitter of claim 1, wherein the transmitting coil unit is configured in such a manner that an impedance value thereof is changed according to positions of the receiving coil unit and the transmitting coil unit, and wherein the transmitter further comprises a controller that is configured to transmit a control signal to the driving unit such that the impedance value is present within a preset range.

* * * * *